United States Patent [19]
Albers et al.

[11] Patent Number: 5,867,269
[45] Date of Patent: Feb. 2, 1999

[54] RLG MIRROR CONDITIONING AND CATHODE OXIDATION PROCESS

[75] Inventors: Steven C. Albers, Anoka County; Timothy J. Callaghan, Ramsey County; Rodney H. Thorland, Ramsey County, all of Minn.

[73] Assignee: Honeywell Inc., Minneapolis, Minn.

[21] Appl. No.: 978,707

[22] Filed: Nov. 26, 1997

[51] Int. Cl.⁶ .................................................. G01C 19/66
[52] U.S. Cl. ............................................. 356/350; 372/94
[58] Field of Search ............................. 356/350; 372/94, 372/87, 88

[56] References Cited

U.S. PATENT DOCUMENTS

| | | | |
|---|---|---|---|
| 4,595,377 | 6/1986 | Norvell | 372/87 |
| 4,926,437 | 5/1990 | Ford | 372/84 |
| 5,052,012 | 9/1991 | Norvell | 372/94 |

*Primary Examiner*—Samuel A. Turner
*Attorney, Agent, or Firm*—Albert K. Kau

[57] ABSTRACT

A method performed during the processing of a ring laser gyro (RLG) will produce a long life in the RLG. The method includes filling the RLG with a gas mixture. A current is discharged within the RLG which will create certain reactions to condition the RLG for a long life.

13 Claims, 2 Drawing Sheets

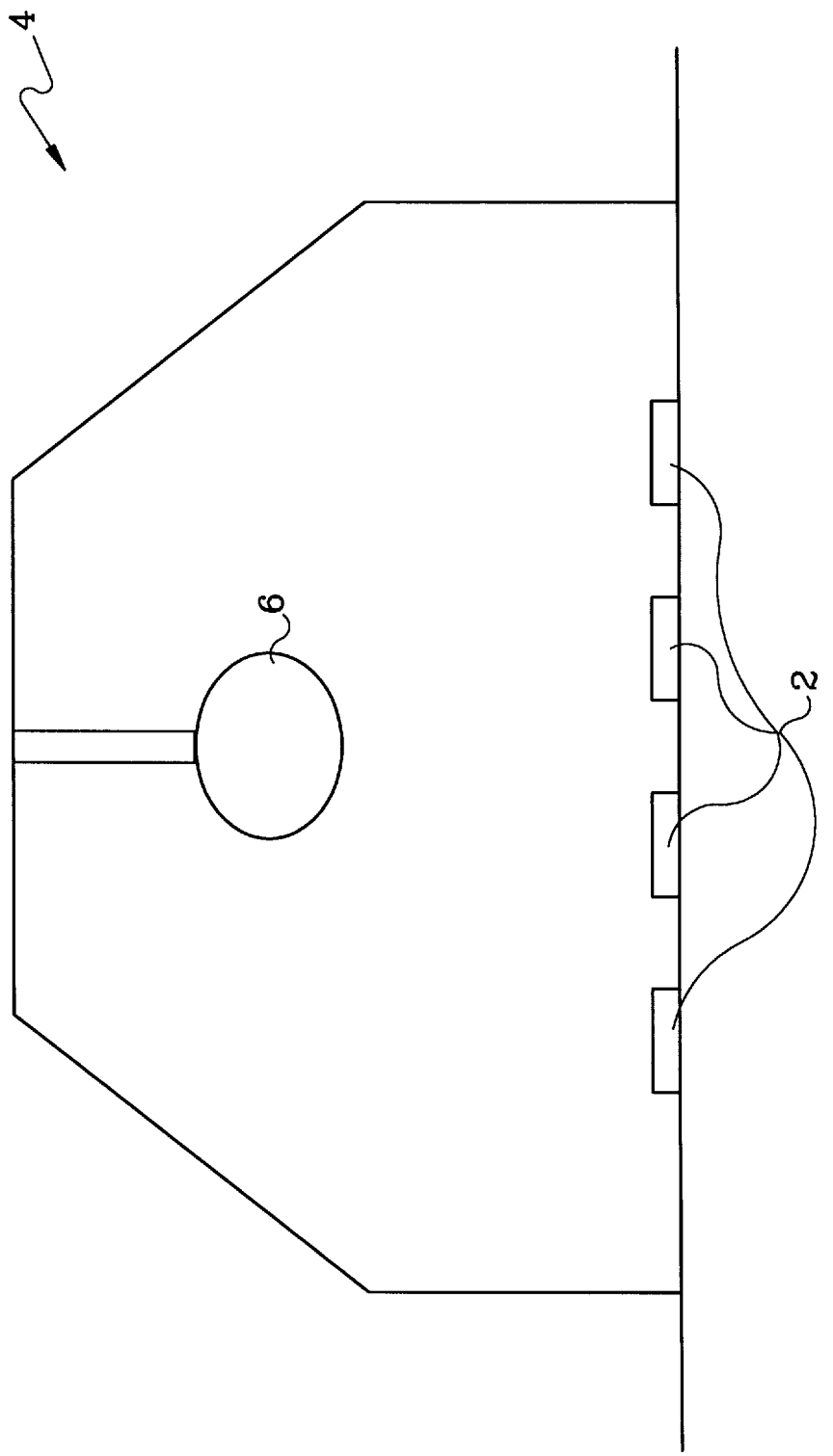

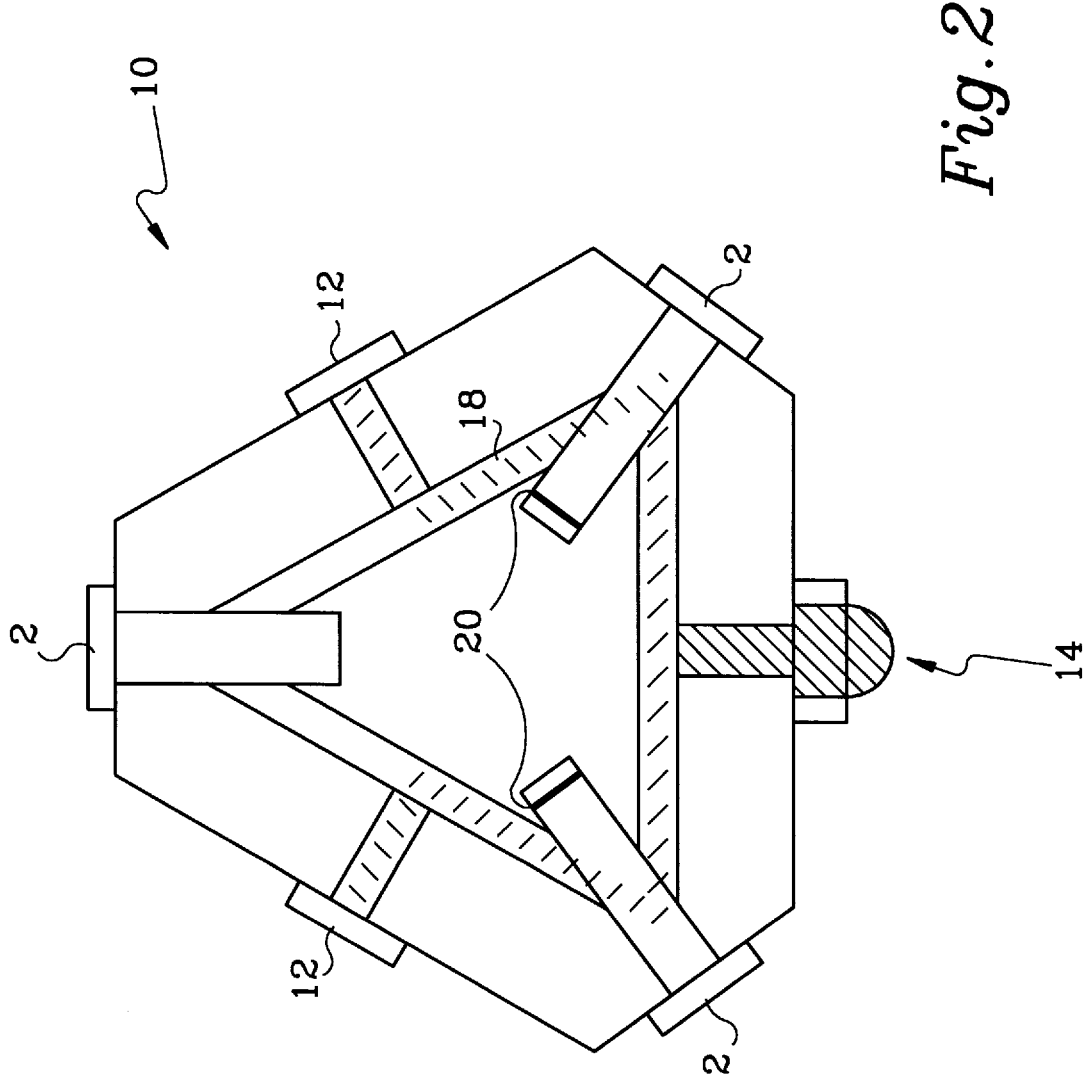

RLG MIRROR CONDITIONING AND CATHODE OXIDATION PROCESS

BACKGROUND OF THE INVENTION

The life of a ring laser gyro (RLG) is always an issue in the area of ring laser gyros and the importance of a long life is well known. Many current processes attempt to prolong the life of a ring laser gyro by the use of gases in the production period of a ring laser gyro. One use of gases to assist in the processing of the ring laser gyro block is the use of oxygen. Oxygen is entered into the ring laser gyro block. By running a discharge current inside the cathode of a ring laser gyro, oxidation will occur creating an oxygen implantation process inside the cathode. The oxidation of the cathode will prolong the life of the cathode and in turn increase the life of the ring laser gyro.

However, creating all these steps in conditioning different parts of the ring laser gyro to prolong its life is cumbersome and time consuming. It would be beneficial to provide a process that conditions all of the parts of the ring laser gyro at the same time to reduce in capital requirements and process cycle time.

The invention has been described herein in order to comply with the Patent Statutes and to provide those skilled in the art with the information needed to apply the novel principles and to construct and use such specialized components as are required. However, it is to be understood that the invention can be carried out by specifically different methods, components and materials, and that various modifications, both as to the process details and materials, can be accomplished without departing from the scope of the invention itself.

SUMMARY OF THE PRESENT INVENTION

The present invention is a method of processing a ring laser gyro to create a ring laser gyro with longer life than current ring laser gyros. The process occurs before Helium Neon is placed in the ring laser gyro for operation. The process includes filling the ring laser gyro block with a gas mixture. A current is then discharged with the ring laser gyro block. Certain chemical reactions will occur to condition the ring laser gyro for a long life. The gas mixture will then be evacuated from the ring laser gyro to create a vacuum system and later the Helium Neon will be placed in the ring laser gyro.

BRIEF DESCRIPTION OF THE DRAWINGS

FIG. 1 shows a Ultraviolet Ozone Cleaning System.

FIG. 2 shows the side view of a ring laser gyro.

DETAILED DESCRIPTION OF THE PRESENT INVENTION

The present invention provides a process to combine processes so that the entire ring laser gyro is conditioned so that long life will be produced.

FIG. 1 shows mirrors 2 placed in a Ultraviolet Ozone Cleaning System (UVOCS) 4. The mirrors 2 are placed in the UVOCS 4 within an hour prior to block assembly. The UVOCS 4 includes an ultraviolet lamp 6 and the mirrors 2 are placed about a fifth of an inch below the UVOCS chamber lamp 6 and is exposed to the lamp 6 for about four hours. The lamp 6 creates ozone in the air by activating the ozone to become aggressive or rather, in an electrically excited state. As a result, the surface of the mirror 2 will be cleaned. The ultraviolet also aides in the oxidation of the mirrors 2 by activating absorption sites in the mirrors 2.

The mirrors 2 are cleaned by this process rather than using a microdetergent because microdetergents have the possibility of leaving a residue on the mirrors 2. Residue on the mirrors 2 will affect the effectiveness of the mirrors 2 and thus deteriorate the operation of the ring laser gyro. UVOCS 4 is well known in this area of technology and will not be discussed in any further detail here.

After the mirrors 2 are cleaned, the mirrors 2 are placed on the ring laser gyro block 10 which is shown in FIG. 2. Placing mirrors 2 on ring laser gyro blocks 10 is well known in this area of technology and will not be discussed in any detail. The block assembly 10 also includes two anodes 12 and a cathode 14 as well as a laser beam path 16. The block assembly 10 is mounted onto a fill station. For about an hour, gas, mostly air, is pumped out of the block 10 at room temperature. The gas is pumped out of the block 10 to create a vacuum. The pumping is performed by a leak detector which is well known in this area of technology. The leak detector is also used to perform a leak check to determine for seal integrity if the seals are leaking any gas. Leak detection is especially important when the block 10 is filled again, because if any leak occurred, then the gas to be filled in the ring laser gyro block 10 would be contaminated and the operation of the ring laser gyro would be affected. This step of pumping out gases in the ring laser gyro block 10 is well known in this area of technology and will not be discussed any further here.

After about an hour after initiation of the pumpdown, the block 10 is filled with 7 torr 20:1 HeNe and 0.1 torr $O_2$ gas mixture (Oxygen doped HeNe gas). The pressure and gas mixture ratios are used purely as an example of the preferred embodiment, but the values are variable depending on the specific requirements of a ring laser gyro. For example, size of the gyro would change these values. After the gas mixture is filled in the ring laser gyro block 10, an electrical discharge path 18 is formed in the block 10 with a current for 4 hours. This discharge path 18 creates an ultra-violet spectrum by the Helium, Neon and Oxygen on the mirrors 2 which increases the life of the mirrors 2. The specific gas mixture is used because it creates a more intense vacuum ultraviolet spectrum.

At the same time the spectrum is being created, the discharge causes the oxygen to oxidize the cathode 14 providing protection in the cathode 14 to sustain a long life. Also using the moisture that is outgassed during this process aides the oxidation. 4 hours of discharge is used in the preferred embodiment, but any period time can be used as long as the ultra-violet spectrum is created and oxidation of the cathode occurs. The period of time could vary depending on the size of the ring laser gyro.

The gas mixture is then pumped out by the leak detector since the ring laser gyro 10 has now been conditioned by the gas mixture. After the pumpdown, the block 10 is baked overnight at elevated temperatures. The purpose of baking is to ensure that the internal walls of the block 10 are degassed. The process of baking is well known in this area of technology and will not be discussed in any further detail here. The internal getter 20 is then flashed after the baking process. Flashing is evaporating a Barium metal charge from the getter 20 by a RF induction heater. The Barium absorbs gas impurities and is used because it will absorb gases such as $O_2$, $N_2$, $H_2$ but not inert gases such as HeNe. Flashing is also well known in this area of technology and will not be discussed in any further detail here. The block 10 is then pumped yet once again so that gases which may not have been absorbed by flashing the getter 20 are now removed.

Finally, the block 10 is filled with about 8 torr of 20:1:1 $He^3$:$Ne^{20}$:$Ne^{22}$ which will create the very basic laser configurations in the ring laser gyro 10. Again, the pressure and gas mixture ratio values are variable depending on specific requirements to a specific ring laser gyro. The values used here are merely examples of the preferred embodiment, but are not limited to these values. The block 10 is then pinched off from the fill station and a seal is formed. Various time frames have been used to describe the preferred embodiment, but the times can fluctuate to achieve the desired effect for differing specific situations. Further, different tools can be used to perform the various process steps and are used as only one example to specifically describe the preferred embodiment.

The embodiments of the invention in which an exclusive property or right is claimed are defined as follows:

1. A method of processing a vacuum ring laser gyro assembly, comprising the steps of:

(a) filling the ring laser gyro with a first gas mixture which comprises an inert gas lightly doped with an oxidizing medium;

(b) directing a current in the ring laser gyro;

(c) evacuating the gas mixture from the ring laser gyro; and (d) filling the ring laser gyro with a second gas mixture for operation of the ring laser gyro.

2. The method of claim 1 wherein the first gas mixture comprises Helium, Neon and Oxygen.

3. The method of claim 1 wherein the first gas mixture comprises Helium and Oxygen.

4. The method of claim 1 wherein the first gas mixture comprises Neon and Oxygen.

5. The method of claim 1 wherein the second gas mixture comprises Helium and Neon.

6. The method of claim 1, further comprising the step of cleaning mirrors of the ring laser gyro before step (a).

7. The method of claim 6 wherein the step of cleaning is performed by exposing the mirrors of the ring laser gyro to an ultraviolet light.

8. The method of claim 6 wherein the step of cleaning is performed for approximately four hours.

9. The method of claim 6, further comprising the step of pumping gas out of the ring laser gyro to create a vacuum wherein said step of pumping is performed after the step of cleaning and before step (a).

10. The method of claim 1 wherein step (b) is performed for approximately four hours.

11. The method of claim 1 wherein step (c) further comprises the steps of:

(i) pumping gas out of the ring laser gyro; and (ii) baking the ring laser gyro.

12. The method of claim 1 wherein the mirrors of the ring laser gyro are exposed to an ultraviolet light before step (c).

13. The method of claim 9 wherein the step of pumping is performed for approximately an hour prior to step (a).

* * * * *